United States Patent
Han et al.

(10) Patent No.: US 12,370,774 B2
(45) Date of Patent: Jul. 29, 2025

(54) PULSE CURRENT-ASSISTED ROLL BONDING METHOD FOR MAGNESIUM/TITANIUM COMPOSITE PLATE WITH LARGE THICKNESS RATIO

(71) Applicant: TAIYUAN UNIVERSITY OF TECHNOLOGY, Taiyuan (CN)

(72) Inventors: Jianchao Han, Taiyuan (CN); Junxin Wei, Taiyuan (CN); Wei Zhang, Taiyuan (CN); Shuaishuai Zhang, Taiyuan (CN); Hui Niu, Taiyuan (CN); Litao Gou, Taiyuan (CN); Yi Jia, Taiyuan (CN); Zhongkai Ren, Taiyuan (CN); Yuanming Liu, Taiyuan (CN); Tao Wang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 19/004,101

(22) Filed: Dec. 27, 2024

(65) Prior Publication Data
US 2025/0222679 A1    Jul. 10, 2025

(30) Foreign Application Priority Data

Jan. 10, 2024    (CN) .......................... 202410033061.1

(51) Int. Cl.
*B32B 15/01*    (2006.01)
*B32B 37/06*    (2006.01)
(Continued)

(52) U.S. Cl.
CPC .............. *B32B 15/01* (2013.01); *B32B 37/06* (2013.01); *B32B 37/18* (2013.01);
(Continued)

(58) Field of Classification Search
CPC ......... B32B 15/01; B32B 37/06; B32B 37/18; B32B 38/0012; B32B 38/0036;
(Continued)

(56) References Cited

U.S. PATENT DOCUMENTS

2008/0292899 A1    11/2008    Tanimoto et al.
2018/0345420 A1    12/2018    Jacoby et al.
(Continued)

FOREIGN PATENT DOCUMENTS

CN    104014589    9/2014
CN    107428128    12/2017
(Continued)

OTHER PUBLICATIONS

CN 115739998, machine translation (Year: 2023).*
(Continued)

*Primary Examiner* — John A Hevey
(74) *Attorney, Agent, or Firm* — Pilloff Passino & Cosenza LLP; Rachel K. Pilloff; Sean A. Passino

(57) ABSTRACT

A pulse current-assisted roll bonding method for a magnesium/titanium composite plate with a large thickness ratio is provided. The specific steps are as follows: 1, pre-treating a slab; 2, applying a pulse current; 3, rolling and bonding; and 4, post-treating the slab. The magnesium/titanium composite plate with the large thickness ratio is obtained.

5 Claims, 8 Drawing Sheets

(51) Int. Cl.
*B32B 37/18* (2006.01)
*B32B 38/00* (2006.01)
*B32B 38/16* (2006.01)
*C22F 1/06* (2006.01)

(52) U.S. Cl.
CPC ...... *B32B 38/0012* (2013.01); *B32B 38/0036* (2013.01); *B32B 38/162* (2013.01); *B32B 38/164* (2013.01); *C22F 1/06* (2013.01); *B32B 2038/0048* (2013.01); *B32B 2311/18* (2013.01)

(58) Field of Classification Search
CPC ............... B32B 38/162; B32B 38/164; B32B 2038/0048; B32B 2311/18; C22F 1/06
See application file for complete search history.

(56) References Cited

U.S. PATENT DOCUMENTS

| | | |
|---|---|---|
| 2023/0041063 A1 | 2/2023 | Jo et al. |
| 2023/0399716 A1 | 12/2023 | Wang et al. |
| 2024/0304514 A1 | 9/2024 | Maeda et al. |
| 2025/0041961 A1* | 2/2025 | Han .................. B23K 20/04 |

FOREIGN PATENT DOCUMENTS

| | | | |
|---|---|---|---|
| CN | 206824395 | 1/2018 | |
| CN | 108273847 A * | 7/2018 | ............... B21B 1/38 |
| CN | 109675926 | 4/2019 | |
| CN | 111702008 A * | 9/2020 | ............... B21B 1/30 |
| CN | 112108518 | 12/2020 | |
| CN | 112743077 | 5/2021 | |
| CN | 114231870 | 3/2022 | |
| CN | 115739998 | 3/2023 | |
| CN | 115739998 A * | 3/2023 | |
| CN | 116237389 | 6/2023 | |
| CN | 116623165 | 8/2023 | |
| CN | 116648315 | 8/2023 | |
| CN | 116651937 | 8/2023 | |
| CN | 116900050 | 10/2023 | |
| FR | 1343889 | 11/1963 | |
| JP | H06280087 | 10/1994 | |
| JP | H0910964 | 1/1997 | |
| JP | 2002000971 | 1/2002 | |
| JP | 2002161334 | 6/2002 | |
| JP | 2008056965 | 3/2008 | |
| JP | 2011025264 | 2/2011 | |
| JP | 2015202680 | 11/2015 | |
| KR | 20220068742 | 5/2022 | |
| SU | 1736653 | 5/1992 | |
| WO | 2007029487 | 3/2007 | |

OTHER PUBLICATIONS

CN-111702008-A, machine translation (Year: 2020).*
CN-108273847-A, machine translation (Year: 2018).*
Retrieval report—First search dated Feb. 7, 2024 in SIPO application No. 202410033061.1.
Retrieval report—Supplementary search dated Mar. 5, 2024 in SIPO application No. 202410033061.1.
Notification to Grant Patent Right for Invention dated Mar. 8, 2024 in SIPO application No. 202410033061.1.
Zhang Kaifeng, "Study progress on heat and polarity effects of current in sheet metal forming with resistance heating," Forging & Stamping Technology, Jul. 25, 2018, pp. 71-90, vol. 43, No. 7. DOI: 10.13330/j.issn.1000-3940.2018.07.008 Claims involved: 1-7.
Wang Tao et al., "Analysis of Microstructure and Mechanical Properties for Welding Joints of Dissimilar Metals between Magnesium and Titanium by Cold Metal Transfer Method," Journal of Mechanical Engineering, Feb. 20, 2014, pp. 75-79, vol. 50, No. 4. DOI: 10.3901/JME.2014.04.075 Claims involved: 1-9.
Xu Xue-Li et al., "Research progress on the application of electroplastic effect in materials processing," Journal of Plasticity Engineering, Dec. 28, 2017, pp. 1-7, vol. 24, No. 6. DOI: 10.3969/j.issn.1007-2012.2017.03.001 Claims involved: 1-9.
Cheng Yujie et al., "Synthesis Techniques and Research Progress of the Metal-Intermetallic Laminate Composites Ti / Al3Ti," Materials China, Apr. 30, 2015, pp. 317-325, vol. 34, No. 4. DOI: 10.7502/j.issn.1674-3962.2015.04.08 Claims involved: 1-9.
Tao Wang et al., "Plastic deformation mechanism transition with solute segregation and precipitation of 304 stainless steel foil induced by pulse current," Materials Science & Engineering: A, Mar. 1, 2022, pp. 1-11, vol. 840, No. 142899. DOI: 10.1016/j.msea.2022.142899 Claims involved: 1-9.
Tingting Zhang et al., "A new method for fabricating Mg/Al alloy composites by pulse current-assisted rolled welding," Materials Letters, Sep. 26, 2022, pp. 1-4, vol. 330, No. 133247. DOI: 10.1016/j.matlet.2022.133247. Claims involved: 1-9.
Zhongkai Ren et al., "Effect of pulse current treatment on interface structure and mechanical behavior of TA1/304 clad plates," Materials Science & Engineering: A, Jul. 14, 2022, pp. 1-11, vol. 850, No. 143583. DOI: 10.1016/j.msea.2022.143583 Claims involved: 1-9.
Notice of first Office action dated Feb. 19, 2024 in SIPO application No. 2024100330611.

* cited by examiner

PULSE CURRENT-ASSISTED ROLL BONDING METHOD FOR MAGNESIUM/TITANIUM COMPOSITE PLATE WITH LARGE THICKNESS RATIO

CROSS-REFERENCE TO RELATED APPLICATIONS

This application claims priority to Chinese Patent Application No. 202410033061.1, filed on Jan. 10, 2024, the contents of which are hereby incorporated by reference.

TECHNICAL FIELD

The disclosure relates to the technical field of preparation of alloy materials, in particular to a pulse current-assisted roll bonding method for a magnesium/titanium composite plate with a large thickness ratio.

BACKGROUND

A magnesium/titanium composite plate with a large thickness ratio (the thickness ratio of magnesium to titanium is 20:1 or above) is prepared by using magnesium and magnesium alloy plate with large thickness as the base layer and extremely thin titanium alloy as the cladding layer. Therefore, the magnesium/titanium composite plate with a large thickness ratio has excellent properties of magnesium and titanium at the same time. The magnesium/titanium composite plate with a large thickness ratio has excellent corrosion resistance and surface strength and toughness of titanium alloy on the premise of low density of magnesium alloy, so it has great application prospects in aerospacecraft, which require strict density and comprehensive performance, such as space stations, satellites and space shuttle aircraft. However, due to the conventional incompatibility between magnesium and magnesium alloy plate with large thickness and titanium thin plate, there is a big difference in plastic deformation ability. When the two plates are combined, the deformation of magnesium and magnesium alloy plate is much larger than the titanium thin plate, and the extremely uncoordinated deformation makes the stability and mechanical properties of the joint interface of composite plate blank poor. The poor stability and mechanical properties leads to the phenomenon that titanium thin plate is crushed and the plate is cracked and cannot be combined when rolling under large reduction. Because of the limitations of the existing preparation processes, the development and wide application of magnesium/titanium composite plate with large thickness ratio are hindered.

At present, the preparation processes of the magnesium/titanium composite plate with large thickness ratio mainly includes explosive clapping method, hot rolling bonding method and diffusion bonding method. Explosive welding is a welding technology that two or more kinds of metal plates separated by gaps are placed in parallel, and high-speed oblique collision occurs between two or more metal bodies through the energy of explosive detonation, so as to produce solid phase between metal bodies. However, titanium and magnesium have conventional incompatibility, explosive fusion welding cannot form a stable bonding interface, and the thickness of the cladding is very small, which leads to problems such as cracking and crushing of the titanium thin plate when bonding. Hot rolling bonding method is to treat the surfaces of metals to be bonded, put the surfaces to be bonded together in contact, and then heat and roll, so that metal plates are plastically deformed under the action of high temperature and high pressure to realize the bonding between metals. However, the setting of roll bonding process parameters is complicated, such as rolling reduction rate, rolling temperature, rolling speed and other parameters. The parameters will affect the finished product quality of laminated plates, and the titanium thin plate are easy to break during rolling with large reduction and cannot be effectively bonded with the magnesium and magnesium alloy plate with large thickness. Diffusion bonding method has obvious advantages for joining dissimilar materials, including direct solid diffusion bonding and instantaneous liquid phase diffusion bonding. However, direct solid-state diffusion bonding takes a long time, and the size and shape of the product are also limited, which is not suitable for industrial mass production. To sum up, the existing preparation methods of titanium-magnesium composite plates all have defects in different degrees.

SUMMARY

The disclosure aims at solving the problems that the explosive fusion welding of a magnesium/titanium composite plate with a large thickness ratio cannot form a stable bonding interface, and at the same time, the thickness of a cladding plate is very small, and the titanium thin plate is cracked and crushed during bonding. The process parameter setting of roll bonding method is complicated, and the rolling reduction rate, rolling temperature, rolling speed and other parameters will all affect the finished product quality of laminated plates. The titanium thin plate is easy to break during rolling with large reduction, and cannot be effectively bonded with the magnesium and magnesium alloy plate with large thickness. For the problems of preparing the magnesium/titanium composite plate with the large thickness ratio by diffusion bonding method, solid-state diffusion bonding takes a long time, and the size and shape of the product are also limited, which is not suitable for industrial mass production. The disclosure provides a pulse current-assisted roll bonding method for a magnesium/titanium composite plate with a large thickness ratio.

To achieve the above objectives, the disclosure provides the following scheme:

the disclosure provides a pulse current-assisted roll bonding method for a magnesium/titanium composite plate with a large thickness ratio, including following steps:

Step 1, Pre-Treating a Slab a, cutting a magnesium or magnesium alloy plate with large thickness, an intermediate transition layer foil and a titanium thin plate with large thickness difference into slabs with a same size; placing the magnesium and magnesium alloy plate with large thickness and the titanium thin plate in a box-type vacuum heat treatment furnace for annealing, preserving heat and taking out after cooling;

b, grinding surfaces of each slabs (referring to the magnesium or magnesium alloy plate with large thickness, the intermediate transition layer foil and the titanium thin plate) with sandpaper, removing an oxide layer on surfaces and making board surfaces have a certain roughness at the same time, and cleaning and drying after grinding;

c, assembling cleaned slabs according to a sequence of the titanium thin plate, the intermediate transition layer foil and the magnesium or magnesium alloy plate with large thickness; relatively placing polished plate surfaces with certain roughness with a small gap; and carrying out leveling and straightening after fixation to obtain a magnesium/titanium composite slab with a large thickness ratio;

Step 2, Applying a Pulse Current placing the magnesium/titanium composite slab with the large thickness ratio in a semi-closed protective cover equipped with a pulse current-assisted roll device by using an insulating push plate, introducing inert gas to prevent heating oxidation, applying the pulse current, making the current vertically introduced (the current flows vertically into the slab of magnesium/titanium composite plate slab with the large thickness ratio from the top of the plate, and then forms a closed loop through a power supply module below) into the magnesium/titanium composite slab with the large thickness ratio, electrifying and heating, where each slab and the bonding interface begin to heat; and at the same time, turning on a warm roller device to carry out an induction heating on a roller, and starting rolling after a heating temperature reaches a rolling temperature of the magnesium/titanium composite slab with a large thickness ratio;

Step 3, Rolling and Bonding operating the insulating push rod of a feeding device to push the preheated magnesium/titanium composite slab with the large thickness ratio to the designated area of a rolling mill, starting the rolling mill and starting rolling the composite plate, and rolling the magnesium/aluminum composite slab with the large thickness ratio heated to the rolling temperature by single-pass rolling or multi-pass rolling; and Step 4, Post-Treating the Slab placing the rolled magnesium/titanium composite slab with the large thickness ratio placed in a box-type vacuum heat treatment furnace for annealing, heat preservation and furnace cooling, and then polishing, cleaning and drying the cooled magnesium/titanium composite slab with the large thickness ratio to obtain the magnesium/titanium composite slab with the large thickness ratio.

Optionally, in the step 1, an annealing temperature of the magnesium or magnesium alloy plate with large thickness is 300° C.-500° C., and a heat preservation duration is 30-60 minutes (min); an annealing temperature of the titanium thin plate is 800° C.-1000° C., and a heat preservation time is 60-90 minutes.

Optionally, in the step 1, a thickness of the magnesium and magnesium alloy plate with large thickness is 5-25 millimeters (mm), a thickness of titanium thin plate is 0.1-0.5 mm, and a thickness combination is more than 50:0.1; a thickness of the intermediate transition layer is determined according to experimental requirements, and a thickness of the intermediate transition layer foil is 0.1-0.5 mm; where the thickness combination is the thickness of titanium coating: thickness of magnesium base layer, and the thickness of intermediate transition layer depends on the thickness of magnesium base layer and titanium coating; when the thickness of magnesium plate and titanium thin plate increases, the thickness of intermediate transition layer increases in direct proportion, and the thickness of intermediate transition layer foil is 0.1-0.5 mm.

Cut a slab with a length of 100-300 mm and a width of 50-150 mm.

Optionally, in the step 1, grinding is performed until a surface roughness is Ra1.6-Ra0.8, and each slab is preferably polished by using 1200# sandpaper.

Optionally, in the step 1, a tiny gap is 0.05 mm, and there is air resistance when heating with electricity, so that the bonding interface generates more heat.

Optionally, the intermediate transition layer includes intermediate transition layer aluminum foil, intermediate transition layer zinc foil, intermediate transition layer aluminum alloy foil or intermediate transition layer zinc alloy foil.

Optionally, in the step 2, pulse current parameters are set according to the physical properties of the rolled piece and the rolling process, a current density is 150-500 $A/mm^2$, a frequency is 300-1000 Hz, a power is 10-50 KW, a duty cycle is 20%-60%, and waveform is rectangular.

Optionally, in the step 2, a heating temperature is 400-500° C.

Optionally, in the step 2, the inert gas is argon atmosphere, the argon gas pressure is 0.95-1 MPa, and the mass purity of argon gas is 99.99%.

Optionally, in the step 2, the insulation of the rolling mill stand is realized by placing ceramic insulation gaskets at the bottom of the bearing seat.

Optionally, in the step 3, a pass reduction rate is 20%-25% and a rolling speed is 0.1-0.5 m/s.

Optionally, in the step 4, an annealing temperature is 400° C.-500° C. and a heat preservation duration is 60-90 min.

The disclosure discloses following technical effects.

Firstly, in this invention, a pulse current is vertically applied to a magnesium/titanium composite plate with a large thickness ratio, so that part of the current vertically passes through metal plate blanks (referring to the magnesium and magnesium alloy plate with large thickness, intermediate transition layer foil and titanium sheet) and gaps between plates from above the composite plate to generate heat, and the composite plate blanks are heated to a specified temperature for subsequent rolling and bonding. When the pulse current is applied vertically to the composite slab, there is a certain gap at the bonding interface of each metal slab in the composite slab, and the air resistance is greater than the resistance of each metal slab itself. When the pulse current flows into the gap between the contact surfaces of the composite slab, it will generate a bypass flow, which makes the gap current density increase sharply, and the heat generated by the gap between the metal slabs is greater than that in the slab. Therefore, the bonding interface temperature of slab is higher than the temperature inside the slab, and the foil of intermediate transition layer is melted and diffused by heating, which promotes the composite forming of magnesium/titanium composite plate with large thickness ratio.

Secondly, the other part of the pulse current of the disclosure flows parallel to the slab, forming a long circulating loop including the slab, improving the rolling composite process by using electro-plasticity, and effectively promoting the dislocation and super-dislocation movement ability of metal materials during composite by virtue of the pure electro-plastic effect in the pulse current, enhancing the plastic deformation ability and reducing the deformation resistance of the slab with large thickness ratio, and accelerating the recrystallization process, refining the crystal grains and improving the processing quality of the slab.

Thirdly, by using metals such as aluminum, zinc and alloy foil as the intermediate transition layer, the disclosure effectively relieves the problems that Ti and Mg are not mutually soluble at room temperature and high temperature, and there is no intermetallic compound generated between them, which makes the bonding interface of the magnesium/titanium composite plate with large thickness ratio unstable, cracked and the strength of the composite plate slab reduced.

Fourthly, in the disclosure, the magnesium/titanium composite plate with large thickness ratio is prepared by adopting the pulse current-assisted roll bonding method, so that the effective combination of the composite plate blanks can be realized with less reduction, the performance requirements for the rolling mill are reduced, the critical composite deformation rate is reduced, the edge crack of the composite plate blanks is suppressed, the bonding strength of the metal composite plate is improved, and the production efficiency is improved. And the preparation method provides a new idea for continuous mass production and preparation and processing of the magnesium-titanium composite plate with the large thickness ratio.

Lastly, in the disclosure, the roller is heated to a specified temperature by a warm roller device, and the composite plate slab is rolled at near-isothermal temperature, so that the bonding interface area is in the hot working window, and the problems of crushing and cracking of the titanium thin plate in the rolling composite process due to the low temperature in the rolling deformation area are avoided.

BRIEF DESCRIPTION OF THE DRAWINGS

In order to explain the embodiments of the present disclosure or the technical scheme in the prior art more clearly, the figures needed in the embodiments will be briefly introduced below. Obviously, the figures described below are only some embodiments of the present disclosure, and other disclosures can be obtained according to these disclosures without creative work for ordinary people in the field.

DETAILED DESCRIPTION OF THE EMBODIMENTS

A number of exemplary embodiments of the present disclosure will now be described in detail, and this detailed description should not be considered as a limitation of the present disclosure, but should be understood as a more detailed description of certain aspects, characteristics and embodiments of the present disclosure.

It should be understood that the terminology described in the present disclosure is only for describing specific embodiments and is not used for limiting the present disclosure. In addition, for the numerical range in the present disclosure, it should be understood that each intermediate value between the upper limit and the lower limit of the range is also specifically disclosed. Intermediate values within any stated value or stated range, as well as each smaller range between any other stated value or intermediate values within the stated range are also included in the present disclosure. The upper and lower limits of these smaller ranges can be independently included or excluded from the range.

Unless otherwise specified, all technical and scientific terms used herein have the same meaning as commonly understood by one of ordinary skill in the art to which this disclosure relates. Although the present disclosure only describes the preferred methods and materials, any methods and materials similar or equivalent to those described herein can also be used in the practice or testing of the present disclosure. All documents mentioned in this disclosure are incorporated by reference to disclose and describe methods and/or materials related to the documents. In case of conflict with any incorporated document, the contents of this disclosure shall prevail.

It is obvious to those skilled in the art that many improvements and changes can be made to the specific embodiments of the present disclosure without departing from the scope or spirit of the present disclosure. Other embodiments will be apparent to the skilled person from the description of the disclosure. The descriptions and Embodiments of the present disclosure are exemplary only.

The terms "including", "comprising", "having" and "containing" used herein are all open terms, which means including but not limited to.

Embodiment 1

Figure 8:
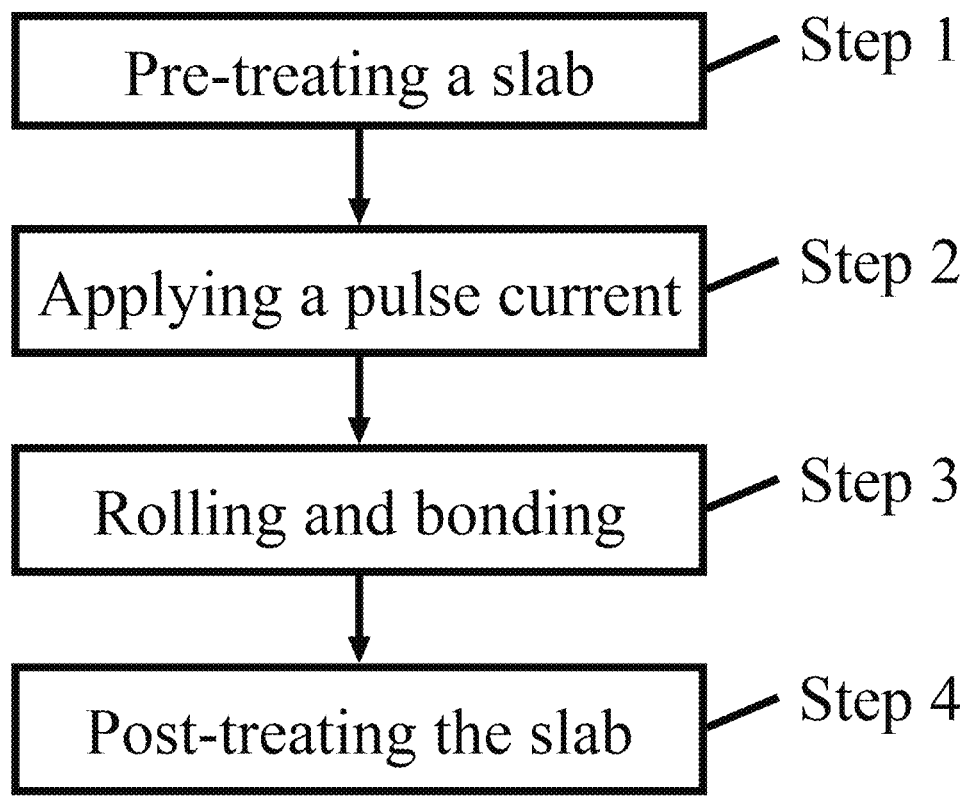
FIG. 8 is a process of a pulse current-assisted roll bonding method for a magnesium/titanium composite plate with a large thickness ratio of the present invention.

The preparation method of a magnesium/titanium composite plate with a large thickness ratio is as follows, as shown in FIG. 8:

Step 1: Pre-Treating of a Slab a, a magnesium alloy plate with a large thickness of 5 mm, an intermediate layer aluminum alloy foil with a thickness of 0.1 mm and a titanium thin plate with a thickness of 0.1 mm, which are quite different in thickness, are cut into slabs with the same size by electric spark, and a thickness combination ratio is 1:50. A length and a width of slabs are 100 mm and 50 mm respectively, and the magnesium alloy plate with large thickness is placed in a box-type vacuum heat treatment furnace for 30 min at 300° C., and the titanium thin plate is placed in the box-type vacuum heat treatment furnace for 90 min at 800° C. After cooling, the magnesium alloy plate with large thickness and the titanium thin plate are taken out.

b, cleaning the above-mentioned slabs: in order to remove the oxide layer on the surface and make the surface of the slab have a certain roughness, the surface of each slab is polished by using 500 #, 800 #, 1200 #, 1500 #and 2000 #sandpaper. Clean with anhydrous ethanol or acetone solution and dry after polishing.

c, assemble the cleaned slab according to the sequence of the titanium thin plate, the intermediate transition layer aluminum alloy foil and the magnesium alloy plate with large thickness, so that the polished plate surfaces with certain roughness are relatively placed, and a small gap is reserved. Then leveling and straightening are carried out after fixing, so as to obtain the magnesium/titanium composite slab with the large thickness ratio.

Step 2: Applying a Pulse Current

Relevant parameters such as current density, frequency and power of the pulse power supply are set according to the material properties and preparation process of the magnesium alloy plate with large thickness, intermediate transition layer aluminum alloy foil and titanium thin plate in the composite slab. Parameters setting range for the current density of 500 A/mm$^2$, frequency of 800 Hz, power of 50 KW, duty cycle of 50%, the waveform is rectangular. The composite slab is placed in a semi-closed protective cover equipped with pulse current-assisted roll device by using an insulating push plate, and inert gas argon is introduced to prevent heating oxidation. The argon gas pressure is 0.95 MPa, and the quality purity of argon is 99.99%. Turn on the power switch, so that the current vertically flows into the slab of magnesium/titanium composite plate with large thickness ratio from the upper part of the plate surface, and then forms a closed loop through the lower power supply assembly, so that the current vertically flows into the slab, and the slab and the bonding interface start heating, and the heating temperature reaches 400° C. At the same time, turn on the warm roller device to inductively heat the roller to 400° C. and start rolling.

Step 3, Rolling and Bonding

Operating the insulating push rod of a feeding device to push the preheated magnesium/titanium composite slab with the large thickness ratio to the designated area of a rolling mill, starting the rolling mill and starting rolling the composite plate, and adopting one-pass roll bonding, where the pass reduction rate is 20% and the rolling speed is 0.5 m/s.

Step 4, Post-Treating the Slab

The rolled composite slab is placed in a box-type vacuum heat treatment furnace for 90 min at 500° C., annealed and cooled in the furnace. Then the cooled composite plate blank is polished, cleaned and dried to obtain the magnesium/titanium composite plate with the large thickness ratio.

Figure 1:
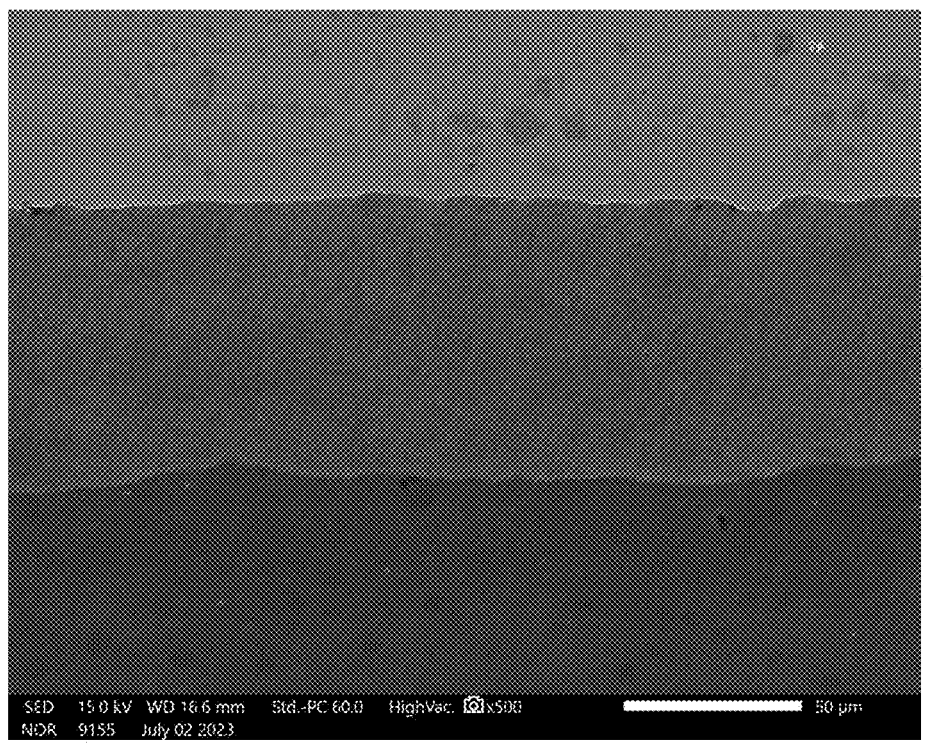
FIG. 1 is a microscopic view of the bonding interface of a magnesium/titanium composite plate with a large thickness ratio prepared in Embodiment 1 of the present disclosure.
Figure 2:
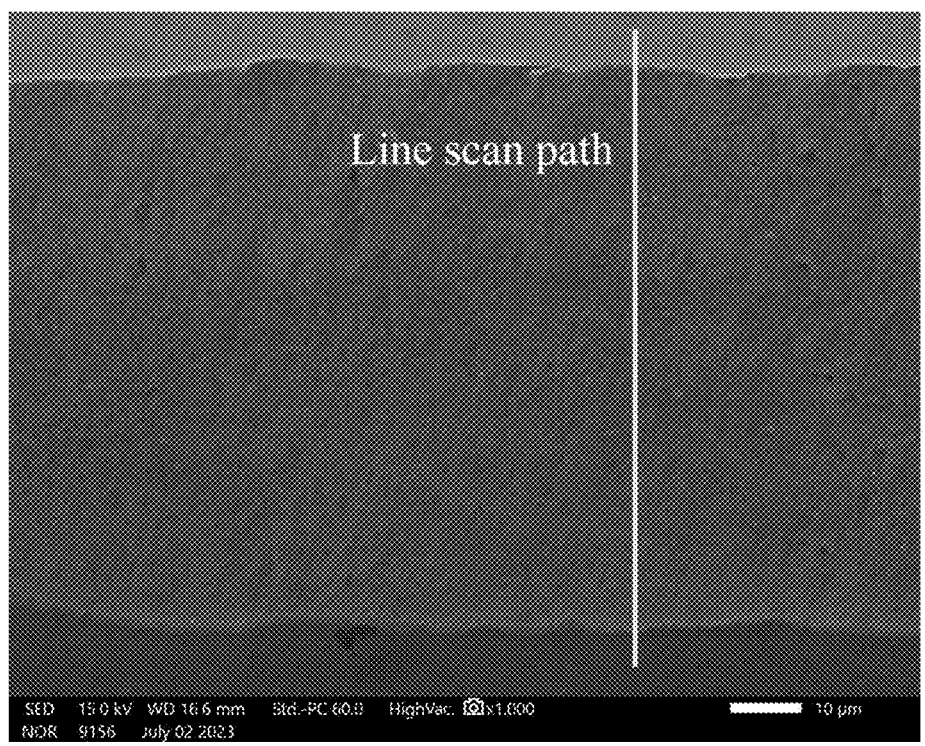
FIG. 2 is an SEM back-scattering image of the cross-sectional interface area of a magnesium/titanium composite plate product with a large thickness ratio in Embodiment 1 of the present disclosure.
Figure 3:
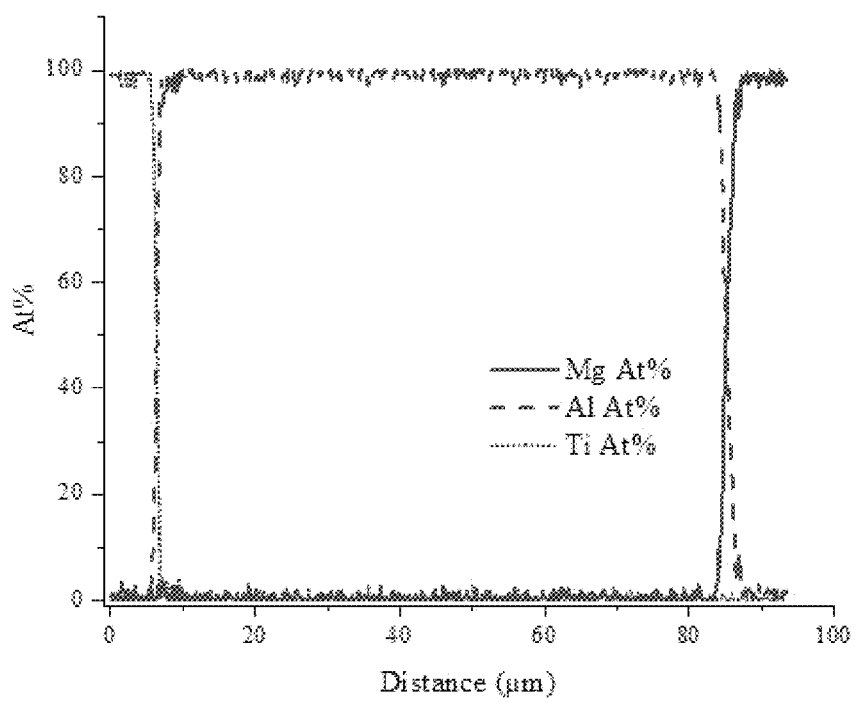
FIG. 3 is an EDS line scanning analysis of the interface of a magnesium/titanium composite plate with a large thickness ratio in Embodiment 1 of the present disclosure.
Figure 4:
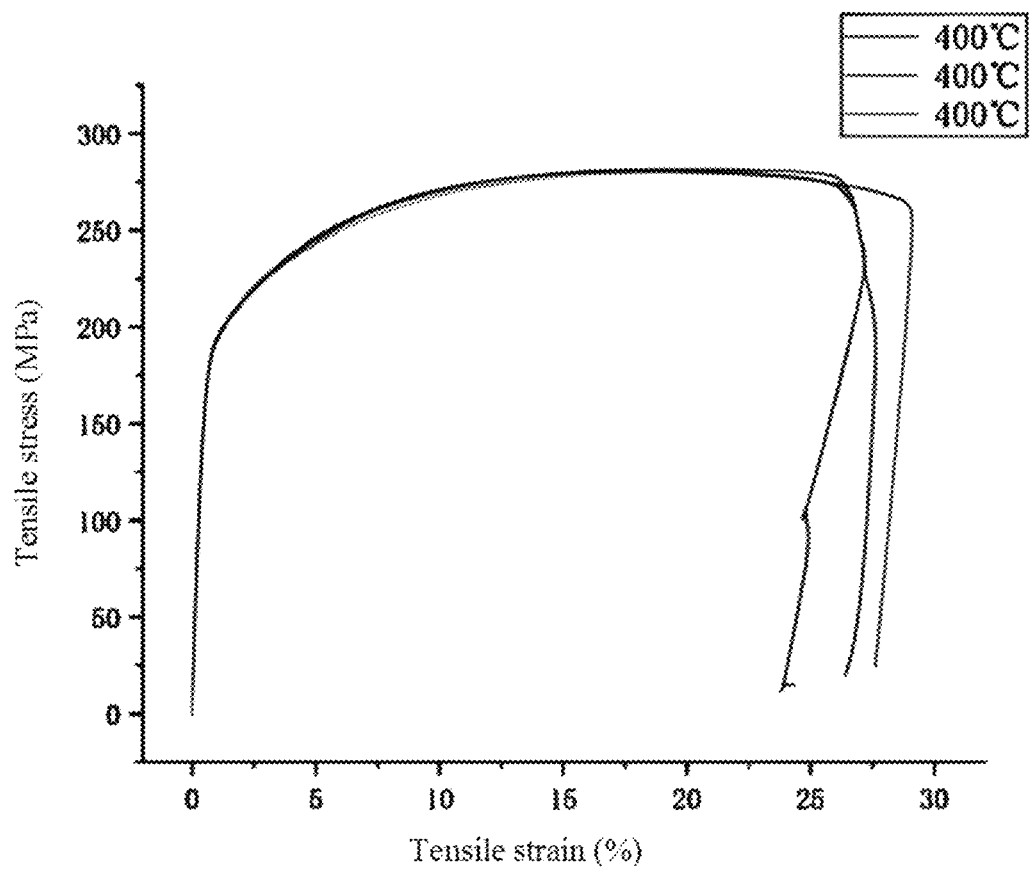
FIG. 4 is the tensile performance curve of a magnesium/titanium composite plate with a large thickness ratio in Embodiment 1 of the present disclosure (three lines appear to eliminate the data contingency, and the experiment is repeated for three times under the same parameters to take the average value).

The microstructure of the bonding interface of the magnesium/titanium composite plate with the large thickness ratio prepared in Embodiment 1 is shown in FIG. 1, the SEM back-scattering image of the cross-sectional interface area is shown in FIG. 2, the EDS line scanning analysis of the interface of the magnesium/titanium composite plate with the large thickness ratio is shown in FIG. 3, and the tensile performance curve is shown in FIG. 4 (three lines appear to eliminate the data contingency, and the experiment is repeated for three times under the same parameters to take the average value). From FIG. 4, it can be seen that the magnesium/titanium composite plate with the large thickness ratio has good elongation and tensile strength. The magnesium/titanium composite plate with large thickness ratio prepared in this embodiment has coordinated deformation, no oxide layer shedding, no edge and end cracking, and good bonding interface. The microstructure of the bonding interface is well integrated, with no large holes and good mechanical properties.

Embodiment 2

The preparation method of the magnesium/titanium composite plate with the large thickness ratio is as follows:
Step 1: Pre-Treating of a Slab a, a magnesium alloy plate with a large thickness of 5 mm, an intermediate layer aluminum alloy foil with a thickness of 0.1 mm and a titanium thin plate with a thickness of 0.1 mm, which are quite different in thickness, are cut into slabs with the same size by electric spark, and a thickness combination ratio is 1:50. A length and a width of slabs are 120 mm and 50 mm respectively, and the magnesium alloy plate with large thickness is placed in a box-type vacuum heat treatment furnace for 60 min at 300° C., and the titanium thin plate is placed in the box-type vacuum heat treatment furnace for 60 min at 1000° C. After cooling, the magnesium alloy plate with large thickness and the titanium thin plate are taken out.

b, cleaning the above-mentioned slabs: in order to remove the oxide layer on the surface and make the surface of the slab have a certain roughness, the surface of each slab is polished by using 500 #, 800 #, 1200 #, 1500 #and 2000 #sandpaper. Clean with anhydrous ethanol or acetone solution and dry after polishing.

c, assemble the cleaned slab according to the sequence of the titanium thin plate, the intermediate transition layer aluminum alloy foil and the magnesium alloy plate with large thickness, so that the polished plate surfaces with certain roughness are relatively placed, and a small gap is reserved. Then leveling and straightening are carried out after fixing, so as to obtain the magnesium/titanium composite slab with the large thickness ratio.

Step 2: Applying a Pulse Current

Relevant parameters such as current density, frequency and power of the pulse power supply are set according to the material properties and preparation process of the magnesium alloy plate with large thickness, intermediate transition layer aluminum alloy foil and titanium thin plate in the composite slab. Parameters setting range for the current density of 500 A/mm$^2$, frequency of 100 Hz, power of 30 KW, duty cycle of 50%, the waveform is rectangular. The composite slab is placed in a semi-closed protective cover equipped with pulse current-assisted roll device by using an insulating push plate, and inert gas argon is introduced to prevent heating oxidation. The argon gas pressure is 1 MPa, and the quality purity of argon is 99.99%. Turn on the power switch, so that the current vertically flows into the slab of magnesium/titanium composite plate with large thickness ratio from the upper part of the plate surface, and then forms a closed loop through the lower power supply assembly, so that the current vertically flows into the slab, and the slab and the bonding interface start heating, and the heating temperature reaches 300° C. At the same time, turn on the warm roller device to inductively heat the roller to 300° C. and start rolling.

Step 3, Rolling and Bonding

Operating the insulating push rod of a feeding device to push the preheated magnesium/titanium composite slab with the large thickness ratio to the designated area of a rolling mill, starting the rolling mill and starting rolling the composite plate, and adopting one-pass roll bonding, where the pass reduction rate is 25% and the rolling speed is 0.2 m/s.

Step 4, Post-Treating the Slab

The rolled composite slab is placed in a box-type vacuum heat treatment furnace for 90 min at 400° C., annealed and cooled in the furnace. Then the cooled composite plate blank is polished, cleaned and dried to obtain the magnesium/titanium composite plate with the large thickness ratio.

Figure 5:
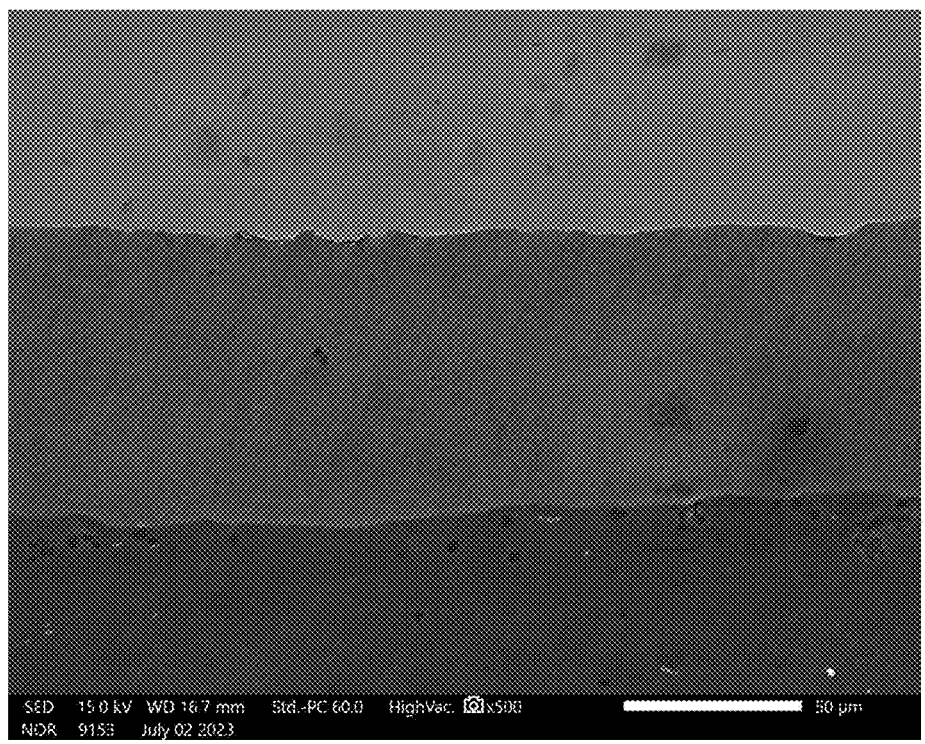
FIG. 5 is a microscopic view of the bonding interface of a magnesium/titanium composite plate with a large thickness ratio in Embodiment 2 of the present disclosure.
Figure 6:
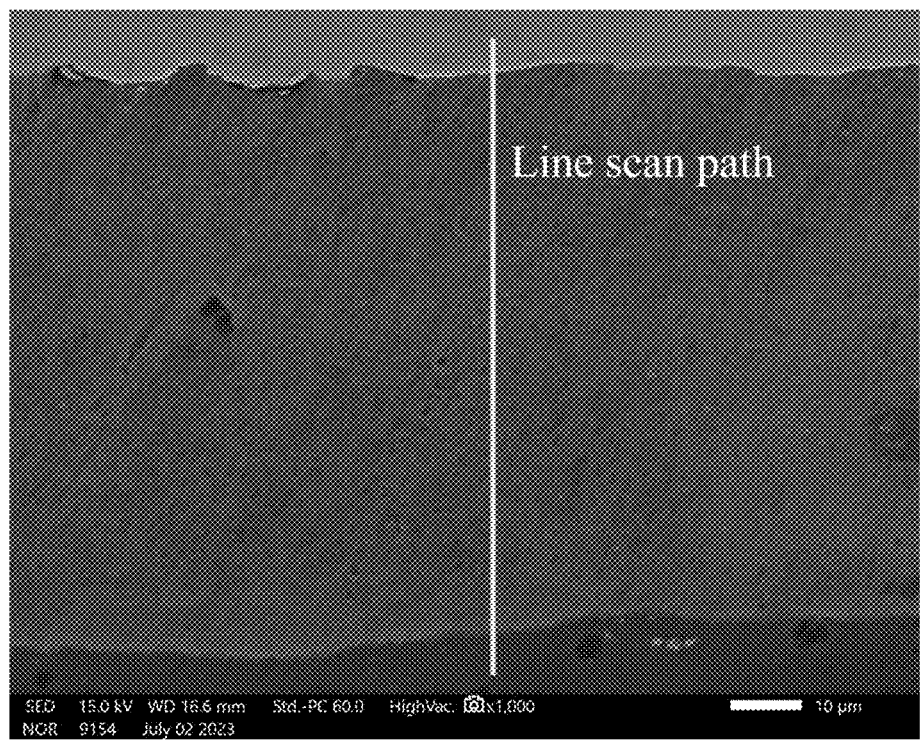
FIG. 6 is an SEM back-scattering image of the cross-sectional interface area of a magnesium/titanium composite plate product with a large thickness ratio in Embodiment 2 of the present disclosure.
Figure 7:
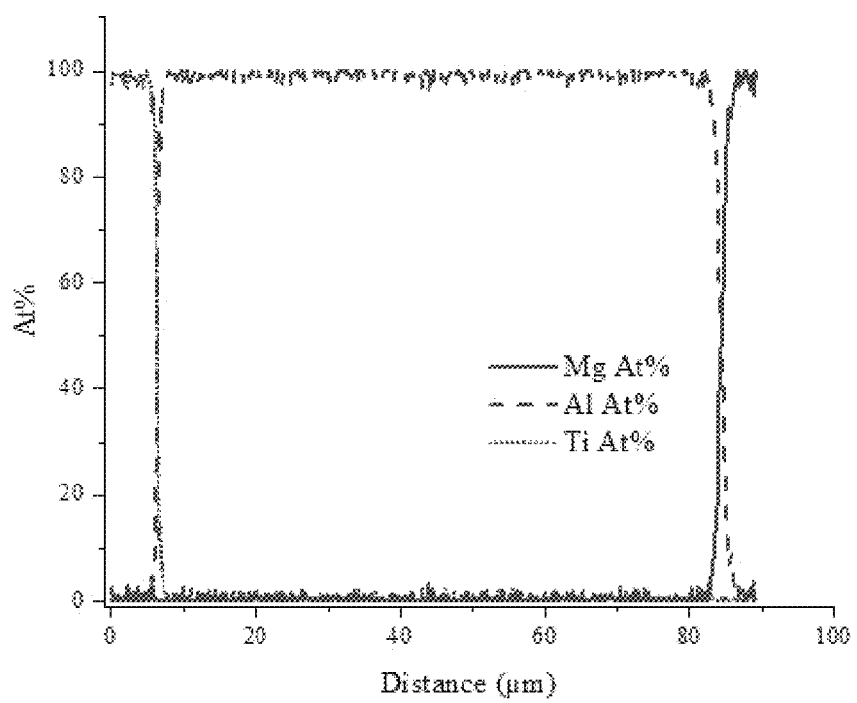
FIG. 7 is an EDS line scanning analysis of the interface of a magnesium/titanium composite plate with a large thickness ratio in Embodiment 2 of the present disclosure.

In Embodiment 2, the microscopic view of the bonding interface of the magnesium/titanium composite plate with the large thickness ratio is shown in FIG. 5, the SEM back-scattering image of the cross-sectional interface area is shown in FIG. 6, and the EDS line scanning analysis of the interface is shown in FIG. 7. In this Embodiment, the magnesium/titanium composite plate with the large thickness ratio can be successfully prepared, and the deformation of the composite plate is coordinated, the bonding interface is stable, and the edges and ends are not cracked. The microstructure bonding interface area is well integrated without large holes.

Embodiment 3

The preparation method of the magnesium/titanium composite plate with the large thickness ratio is as follows:
Step 1: Pre-Treating of a Slab
  a, a magnesium alloy plate with a large thickness of 25 mm, an intermediate layer aluminum alloy foil with a thickness of 0.2 mm and a titanium thin plate with a thickness of 0.5 mm, which are quite different in thickness, are cut into slabs with the same size by electric spark, and a thickness combination ratio is 1:50. A length and a width of slabs are 100 mm and 50 mm respectively, and the magnesium alloy plate with large thickness is placed in a box-type vacuum heat treatment furnace for 50 min at 500° C., and the titanium thin plate is placed in the box-type vacuum heat treatment furnace for 80 min at 900° C. After cooling, the magnesium alloy plate with large thickness and the titanium thin plate are taken out.
  b, cleaning the above-mentioned slabs: in order to remove the oxide layer on the surface and make the surface of the slab have a certain roughness, the surface of each slab is polished by using 500 #, 800 #, 1200 #, 1500 #and 2000 #sandpaper. Clean with anhydrous ethanol or acetone solution and dry after polishing.
  c, assemble the cleaned slab according to the sequence of the titanium thin plate, the intermediate transition layer aluminum alloy foil and the magnesium alloy plate with large thickness, so that the polished plate surfaces with certain roughness are relatively placed, and a small gap 0.03 mm is reserved. Then leveling and straightening are carried out after fixing, so as to obtain the magnesium/titanium composite slab with the large thickness ratio.
Step 2: Applying a Pulse Current
Relevant parameters such as current density, frequency and power of the pulse power supply are set according to the material properties and preparation process of the magnesium alloy plate with large thickness, intermediate transition layer aluminum alloy foil and titanium thin plate in the composite slab. Parameters setting range for the current density of 300 A/mm$^2$, frequency of 300 Hz, power of 20 KW, duty cycle of 20%, the waveform is rectangular. The composite slab is placed in a semi-closed protective cover equipped with pulse current-assisted roll device by using an insulating push plate, and inert gas argon is introduced to prevent heating oxidation. The argon gas pressure is 1 MPa, and the quality purity of argon is 99.99%. Turn on the power switch, so that the current vertically flows into the slab of magnesium/titanium composite plate with large thickness ratio from the upper part of the plate surface, and then forms a closed loop through the lower power supply assembly, so that the current vertically flows into the slab, and the slab and the bonding interface start heating, and the heating temperature reaches 400° C. At the same time, turn on the warm roller device to inductively heat the roller to 400° C. and start rolling.
Step 3, Rolling and Bonding
Operating the insulating push rod of a feeding device to push the preheated magnesium/titanium composite slab with the large thickness ratio to the designated area of a rolling mill, starting the rolling mill and starting rolling the composite plate, and adopting one-pass roll bonding, where the pass reduction rate is 20% and the rolling speed is 0.5 m/s.
Step 4, Post-Treating the Slab
The rolled composite slab is placed in a box-type vacuum heat treatment furnace for 60 min at 500° C., annealed and cooled in the furnace. Then the cooled composite plate blank is polished, cleaned and dried to obtain the magnesium/titanium composite plate with the large thickness ratio.

In this Embodiment, the magnesium/titanium composite with the large thickness ratio is successfully prepared, with good surface quality, coordinated deformation of the composite plate, no cracks at the edges and ends, and good bonding interface.

Embodiment 4

The preparation method of the magnesium/titanium composite plate with the large thickness ratio is as follows:
Step 1: Pre-Treating of a Slab
  a, a magnesium alloy plate with a large thickness of 10 mm, an intermediate layer aluminum alloy foil with a thickness of 0.2 mm and a titanium thin plate with a thickness of 0.2 mm, which are quite different in thickness, are cut into slabs with the same size by electric spark, and a thickness combination ratio is 1:50. A length and a width of slabs are 100 mm and 50 mm respectively, and the magnesium alloy plate with large thickness is placed in a box-type vacuum heat treatment furnace for 40 min at 450° C., and the titanium thin plate is placed in the box-type vacuum heat treatment furnace for 60 min at 900° C. After cooling, the magnesium alloy plate with large thickness and the titanium thin plate are taken out.
  b, cleaning the above-mentioned slabs: in order to remove the oxide layer on the surface and make the surface of the slab have a certain roughness, the surface of each slab is polished by using 500 #, 800 #, 1200 #, 1500 #and 2000 #sandpaper. Clean with anhydrous ethanol or acetone solution and dry after polishing.
  c, assemble the cleaned slab according to the sequence of the titanium thin plate, the intermediate transition layer aluminum alloy foil and the magnesium alloy plate with large thickness, so that the polished plate surfaces with certain roughness are relatively placed, and a small gap is reserved. Then leveling and straightening are carried out after fixing, so as to obtain the magnesium/titanium composite slab with the large thickness ratio.
Step 2: Applying a Pulse Current
Relevant parameters such as current density, frequency and power of the pulse power supply are set according to the material properties and preparation process of the magnesium alloy plate with large thickness, intermediate transition layer aluminum alloy foil and titanium thin plate in the composite slab. Parameters setting range for the current density of 500 A/mm$^2$, frequency of 500 Hz, power of 30 KW, duty cycle of 80%, the waveform is rectangular. The composite slab is placed in a semi-closed protective cover equipped with pulse current-assisted roll device by using an insulating push plate, and inert gas argon is introduced to prevent heating oxidation. The argon gas pressure is 0.95 MPa, and the quality purity of argon is 99.99%. Turn on the power switch, so that the current vertically flows into the slab of magnesium/titanium composite plate with large thickness ratio from the upper part of the plate surface, and then forms a closed loop through the lower power supply assembly, so that the current vertically flows into the slab, and the slab and the bonding interface start heating, and the heating temperature reaches 500° C. At the same time, turn on the warm roller device to inductively heat the roller to 500° C. and start rolling.

Step 3, Rolling and Bonding

Operating the insulating push rod of a feeding device to push the preheated magnesium/titanium composite slab with the large thickness ratio to the designated area of a rolling mill, starting the rolling mill and starting rolling the composite plate, and adopting one-pass roll bonding, where the pass reduction rate is 20% and the rolling speed is 0.5 m/s.

Step 4, Post-Treating the Slab

The rolled composite slab is placed in a box-type vacuum heat treatment furnace for 80 min at 500° C., annealed and cooled in the furnace. Then the cooled composite plate blank is polished, cleaned and dried to obtain the magnesium/titanium composite plate with the large thickness ratio.

Comparative Embodiment 1 (Compared With the Existing Rolling Process, Pulse Current is Not Introduced and Warm Roll Rolling is Not Introduced)

Same as Embodiment 1, the only difference is that the magnesium/titanium composite plate with the large thickness ratio is rolled by the existing common preparation process of the magnesium/titanium composite plate, and the existing rolling process causes the plate to crack and cannot be combined, which shows that the magnesium/titanium composite plate with the large thickness ratio can be effectively prepared by the preparation of this application.

Step 1: Pre-Treating of a Slab a, a magnesium alloy plate with a large thickness of 5 mm, an intermediate layer aluminum alloy foil with a thickness of 0.1 mm and a titanium thin plate with a thickness of 0.1 mm, which are quite different in thickness, are cut into slabs with the same size by electric spark, and a thickness combination ratio is 1:50. A length and a width of slabs are 80 mm and 50 mm respectively, and the magnesium alloy plate with large thickness is placed in a box-type vacuum heat treatment furnace for 30 min at 400° C., and the titanium thin plate is placed in the box-type vacuum heat treatment furnace for 90 min at 800° C. After cooling, the magnesium alloy plate with large thickness and the titanium thin plate are taken out.

b, cleaning the above-mentioned slabs: in order to remove the oxide layer on the surface and make the surface of the slab have a certain roughness, the surface of each slab is polished by using 500 #, 800 #, 1200 #, 1500 #and 2000 #sandpaper. Clean with anhydrous ethanol or acetone solution and dry after polishing.

c, assemble the cleaned slab according to the sequence of the titanium thin plate, the intermediate transition layer aluminum alloy foil and the magnesium alloy plate with large thickness, so that the polished plate surfaces with certain roughness are relatively placed, and a small gap is reserved. Then leveling and straightening are carried out after fixing, so as to obtain the magnesium/titanium composite slab with the large thickness ratio.

Step 2, Rolling and Bonding

The composite slab is placed in a box-type vacuum heat treatment furnace for 15 min at 400° C. Operating the insulating push rod of a feeding device to push the preheated magnesium/titanium composite slab with the large thickness ratio to the designated area of a rolling mill, starting the rolling mill and starting rolling the composite plate, and adopting one-pass roll bonding, where the pass reduction rate is 40% and the rolling speed is 0.5 m/s.

In Comparative embodiment 1, due to the great difference in plastic deformability between titanium alloy and magnesium alloy and the difficulty in bonding, the temperature required for direct rolling compounding of magnesium plate with large thickness and titanium thin plate is high and the pass reduction rate is high. Large reduction rate leads to cracking of titanium coating, which makes it impossible to effectively composite.

Comparative Embodiment 2 (Heating With Box-Type Vacuum Heat Treatment Furnace and Rolling With Small Reduction)

Same as Embodiment 1, the only difference is that the magnesium/titanium composite plate with the large thickness ratio is prepared, and pulse current is not introduced.

Step 1: Pre-Treating of a Slab a, a magnesium alloy plate with a large thickness of 5 mm, an intermediate layer aluminum alloy foil with a thickness of 0.1 mm and a titanium thin plate with a thickness of 0.1 mm, which are quite different in thickness, are cut into slabs with the same size by electric spark, and a thickness combination ratio is 1:50. A length and a width of slabs are 100 mm and 50 mm respectively, and the magnesium alloy plate with large thickness is placed in a box-type vacuum heat treatment furnace for 30 min at 400° C., and the titanium thin plate is placed in the box-type vacuum heat treatment furnace for 20 min at 900° C. After cooling, the magnesium alloy plate with large thickness and the titanium thin plate are taken out.

b, cleaning the above-mentioned slabs: in order to remove the oxide layer on the surface and make the surface of the slab have a certain roughness, the surface of each slab is polished by using 500 #, 800 #, 1200 #, 1500 #and 2000 #sandpaper. Clean with anhydrous ethanol or acetone solution and dry after polishing.

c, assemble the cleaned slab according to the sequence of the titanium thin plate, the intermediate transition layer aluminum alloy foil and the magnesium alloy plate with large thickness, so that the polished plate surfaces with certain roughness are relatively placed, and a small gap is reserved. Then leveling and straightening are carried out after fixing, so as to obtain the magnesium/titanium composite slab with the large thickness ratio.

Step 2: Heating the Slab

The magnesium/titanium composite plate with the large thickness ratio is placed in a box-type vacuum heat treatment furnace for 15 min at 400° C. The composite slab is placed in a semi-closed protective cover equipped with pulse current-assisted roll device by using an insulating push plate, and inert gas argon is introduced to prevent heating oxidation. The argon gas pressure is 0.95 MPa, and the quality purity of argon is 99.99%. At the same time, turn on the warm roller device to inductively heat the roller to 400° C. and start rolling.

Step 3, Rolling and Bonding

Operating the insulating push rod of a feeding device to push the preheated magnesium/titanium composite slab with the large thickness ratio to the designated area of a rolling mill, starting the rolling mill and starting rolling the composite plate, and adopting one-pass roll bonding, where the pass reduction rate is 20% and the rolling speed is 0.2 m/s.

In Comparative embodiment 2, the magnesium-titanium composite plate with the large thickness ratio is prepared without introducing pulse current. In this Comparative embodiment, the middle part of the magnesium-titanium composite plate with the large thickness ratio is not successfully bonded. By applying pulse current, the pure electro-plastic effect can be generated to promote the dislocation and super-dislocation movement ability of metal materials during bonding, enhance the plastic deformation ability and reduce the deformation resistance of the slab with the large thickness ratio, and accelerate the recrystallization process, refine the grains and improve the composite forming of the magnesium/titanium composite plate with the large thickness ratio.

Comparative Embodiment 3 (Pulse Current Applied, Rolling Without Introducing Warm Rollers)

Same as in Embodiment 1, the only difference is that a magnesium/titanium composite plate with the large thickness ratio is prepared, and warm roller is not introduced.

Step 1: Pre-Treating of a Slab a, a magnesium alloy plate with a large thickness of 5 mm, an intermediate layer aluminum alloy foil with a thickness of 0.1 mm and a titanium thin plate with a thickness of 0.1 mm, which are quite different in thickness, are cut into slabs with the same size by electric spark, and a thickness combination ratio is 1:50. A length and a width of slabs are 120 mm and 50 mm respectively, and the magnesium alloy plate with large thickness is placed in a box-type vacuum heat treatment furnace for 30 min at 400° C., and the titanium thin plate is placed in the box-type vacuum heat treatment furnace for 20 min at 900° C. After cooling, the magnesium alloy plate with large thickness and the titanium thin plate are taken out.

b, cleaning the above-mentioned slabs: in order to remove the oxide layer on the surface and make the surface of the slab have a certain roughness, the surface of each slab is polished by using 500 #, 800 #, 1200 #, 1500 #and 2000 #sandpaper. Clean with anhydrous ethanol or acetone solution and dry after polishing.

c, assemble the cleaned slab according to the sequence of the titanium thin plate, the intermediate transition layer aluminum alloy foil and the magnesium alloy plate with large thickness, so that the polished plate surfaces with certain roughness are relatively placed, and a small gap is reserved. Then leveling and straightening are carried out after fixing, so as to obtain the magnesium/titanium composite slab with the large thickness ratio.

Step 2, Heating the Slab.

Relevant parameters such as current density, frequency and power of the pulse power supply are set according to the material properties and preparation process of the thick magnesium alloy plate, intermediate transition layer aluminum alloy foil and titanium sheet in the composite slab. The parameter setting range is 300 A/mm$^2$, frequency is 300 Hz, power is 50 KW, duty ratio is 50%, and the waveform is rectangular. The composite slab is placed in a semi-closed protective cover equipped with pulse current-assisted roll device by using an insulating push plate, and inert gas argon is introduced to prevent heating oxidation. The argon gas pressure is 0.95 MPa, and the quality purity of argon is 99.99%. Turn on the power switch, so that the current flows vertically into the slab of magnesium/titanium composite plate with large thickness ratio from the upper part of the plate surface, and then forms a closed loop through the lower power supply assembly, so that the current flows vertically into the slab, and the slab and the bonding interface begin to heat, and the heating temperature reaches 350° C., and rolling begins.

Step 3, Rolling and Bonding

Operating the insulating push rod of a feeding device to push the preheated magnesium/titanium composite slab with the large thickness ratio to the designated area of a rolling mill, starting the rolling mill and starting rolling the composite plate, and adopting one-pass roll bonding, where the pass reduction rate is 25% and the rolling speed is 0.2 m/s.

In this comparative embodiment, warm rolling is not introduced to roll the magnesium/titanium composite plate with large thickness ratio, which led to the crushing of the titanium coating, and the magnesium/titanium composite plate with large thickness ratio could not be successfully prepared, because the titanium coating had poor plastic deformation ability at room temperature, and the titanium thin plate is broken due to direct rolling, which could not effectively compound the titanium thin plate with the magnesium plate.

Comparative Embodiment 4

Same as Embodiment 1, the only difference is that the intermediate layer aluminum alloy foil is not introduced in the process of preparing the magnesium/titanium composite plate with the large thickness ratio, and the magnesium alloy plate with large thickness and titanium thin plate are directly rolled, and the specific process is as follows:

Step 1: Pre-Treating of a Slab a, a magnesium alloy plate with a large thickness of 5 mm, and a titanium thin plate with a thickness of 0.1 mm, which are quite different in thickness, are cut into slabs with the same size by electric spark, and a thickness combination ratio is 1:50. A length and a width of slabs are 100 mm and 50 mm respectively, and the magnesium alloy plate with large thickness is placed in a box-type vacuum heat treatment furnace for 30 min at 400° C., and the titanium thin plate is placed in the box-type vacuum heat treatment furnace for 90 min at 800° C. After cooling, the magnesium alloy plate with large thickness and the titanium thin plate are taken out.

b, cleaning the above-mentioned slabs: in order to remove the oxide layer on the surface and make the surface of the slab have a certain roughness, the surface of each slab is polished by using 500 #, 800 #, 1200 #, 1500 #and 2000 #sandpaper. Clean with anhydrous ethanol or acetone solution and dry after polishing.

c, assemble the cleaned slab according to the sequence of the titanium thin plate, the intermediate transition layer aluminum alloy foil and the magnesium alloy plate with large thickness, so that the polished plate surfaces with certain roughness are relatively placed, and a small gap is reserved. Then leveling and straightening are carried out after fixing, so as to obtain the magnesium/titanium composite slab with the large thickness ratio.

Step 2, Applying the Pulse Current

Relevant parameters such as current density, frequency and power of the pulse power supply are set according to the material properties and preparation process of the thick magnesium alloy plate, intermediate transition layer aluminum alloy foil and titanium sheet in the composite slab. The parameter setting range is 500 A/mm$^2$, frequency is 800 Hz, power is 50 KW, duty ratio is 50%, and the waveform is rectangular. The composite slab is placed in a semi-closed protective cover equipped with pulse current-assisted roll device by using an insulating push plate, and inert gas argon is introduced to prevent heating oxidation. The argon gas pressure is 0.95 MPa, and the quality purity of argon is 99.99%. Turn on the power switch, so that the current flows vertically into the slab of magnesium/titanium composite plate with large thickness ratio from the upper part of the plate surface, and then forms a closed loop through the lower power supply assembly, so that the current flows vertically into the slab, and the slab and the bonding interface begin to heat, and the heating temperature reaches 400° C. At the same time, the warm roller device heats the roller to 400° C. and starts rolling.

Step 3, Rolling and Bonding

Operating the insulating push rod of a feeding device to push the preheated magnesium/titanium composite slab with the large thickness ratio to the designated area of a rolling mill, starting the rolling mill and starting rolling the composite plate, and adopting one-pass roll bonding, where the pass reduction rate is 20% and the rolling speed is 0.5 m/s In the Comparative embodiment, a magnesium/titanium composite plate with a large thickness ratio is prepared without introducing an intermediate layer of aluminum alloy foil, and a magnesium/titanium composite plate with a good flatness could not be successfully obtained, because there is no intermetallic compound between titanium alloy and magnesium alloy, and at the same time, the plastic deformation ability of magnesium/titanium is quite different, so the bonding is difficult, and the temperature required for direct rolling and compounding of the magnesium plate with large thickness and a titanium thin plate is high, and the critical reduction rate per pass is about 40%.

The above-mentioned embodiments only describe the preferred mode of the disclosure, and do not limit the scope of the disclosure. Under the premise of not departing from the design spirit of the disclosure, various modifications and improvements made by ordinary technicians in the field to the technical scheme of the disclosure shall fall within the protection scope determined by the claims of the disclosure.

What is claimed is:

1. A pulse current-assisted roll bonding method for a magnesium/titanium composite slab with a large thickness ratio, comprising the following steps:
   step 1, pre-treating a slab:
   a, cutting a magnesium or magnesium alloy plate with large thickness, an intermediate transition layer foil and a titanium thin plate into slabs with a same length and width dimensions; annealing the slabs of magnesium or magnesium alloy plate with large thickness and the titanium thin plate, preserving heat, cooling the slabs after the annealing step and taking out the slabs after cooling;
   b, grinding surfaces of each of the slabs with sandpaper until a surface roughness is polished to Ra 1.6-0.8 micrometers, cleaning and drying after the grinding; and
   c, assembling cleaned slabs according to a sequence of the titanium thin plate, the intermediate transition layer foil and the magnesium or magnesium alloy plate with large thickness; relatively placing polished slabs surfaces with certain roughness, and leaving a small gap between the slabs, wherein the small gap is of 0.03 mm; and carrying out leveling and straightening to obtain a magnesium/titanium composite slab with a large thickness ratio;
   a thickness of the magnesium or magnesium alloy plate with large thickness is 5-25 mm, a thickness of the titanium thin plate is 0.1-0.5 mm, and a thickness combination ratio of the titanium thin plate to the magnesium or magnesium alloy plate is 1:50;
   step 2, applying a pulse current:
   placing the magnesium/titanium composite slab with the large thickness ratio in a semi-closed protective cover equipped with a pulse current-assisted roll device, introducing inert gas, applying the pulse current, making the current vertically introduced into the magnesium/titanium composite slab with the large thickness ratio from the upper part of the plate surface, wherein a current density is 150-500 A/mm$^2$, a frequency is 300-1000 Hz, a power is 10-50 KW, a duty cycle is 20%-60%, waveform is rectangular; and meanwhile, turning on a warm roller device to carry out an induction heating on a roller, and starting rolling after a heating temperature reaches a rolling temperature of the magnesium/titanium composite slab with the large thickness ratio, wherein the heating temperature is 400-500° C.;
   step 3, rolling and bonding
   rolling the magnesium/titanium composite slab with the large thickness ratio heated to the rolling temperature by adopting single-pass rolling or multi-pass rolling, wherein a pass reduction rate is 20%-25% and a rolling speed is 0.1-0.5 m/s; and
   step 4, post-treating the slab
   annealing a rolled magnesium/titanium composite slab with a large thickness ratio, preserving heat, and furnace cooling, then polishing and cleaning a cooled magnesium/titanium composite slab with a large thickness ratio, and drying to obtain the magnesium/titanium composite slab with the large thickness ratio.

2. The pulse current-assisted roll bonding method for the magnesium/titanium composite slab with the large thickness ratio according to claim 1, wherein in the step 1, an annealing temperature of the slabs of magnesium or magnesium alloy plate with large thickness is 300° C.-500° C., and a heat preservation duration is 30-60 min; an annealing temperature of the titanium thin plate is 800° C.-1000° C., and a heat preservation duration is 60-90 min.

3. The pulse current-assisted roll bonding method for the magnesium/titanium composite slab with the large thickness ratio according to claim 1, wherein in the step 1, a thickness of the intermediate transition layer foil is 0.1-0.5 mm; and slabs with a length of 100-300 mm and a width of 50-150 mm are cut.

4. The pulse current-assisted roll bonding method for the magnesium/titanium composite slab with the large thickness ratio according to claim 1, wherein in the step 2, the inert gas is argon atmosphere, an argon gas pressure is 0.95-1 MPa, and a mass purity of the argon gas is 99.99%.

5. The pulse current-assisted roll bonding method for the magnesium/titanium composite slab with the large thickness ratio according to claim 1, wherein in the step 4, an annealing temperature is 400° C.-500° C. and a heat preservation duration is 60-90 min.

* * * * *